(12) United States Patent
Kittaka

(10) Patent No.: US 6,429,977 B2
(45) Date of Patent: Aug. 6, 2002

(54) OPTICAL IMAGING SYSTEM

(75) Inventor: Shigeo Kittaka, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 34 days.

(21) Appl. No.: 09/745,079

(22) Filed: Dec. 20, 2000

(30) Foreign Application Priority Data

Dec. 20, 1999 (JP) ............................................. 11-361813

(51) Int. Cl.[7] .............................. G02B 3/00; G02B 6/18
(52) U.S. Cl. ........................................ 359/654; 385/124
(58) Field of Search ................................ 359/652, 654; 385/124

(56) References Cited

U.S. PATENT DOCUMENTS

| | | |
|---|---|---|
| 5,555,330 A | 9/1996 | Pan et al. |
| 5,809,193 A | 9/1998 | Takahashi |
| 5,959,783 A | 9/1999 | Kittaka et al. ............... 359/654 |
| 5,978,146 A | 11/1999 | Kittaka et al. ............... 359/654 |

FOREIGN PATENT DOCUMENTS

| | | |
|---|---|---|
| JP | 09-230169 | 9/1997 |
| JP | 10-39166 | 2/1998 |
| JP | 11-14803 | 1/1999 |
| JP | 11-64605 | 3/1999 |

*Primary Examiner*—Scott J. Sugarman
(74) *Attorney, Agent, or Firm*—Merchant & Gould PC

(57) ABSTRACT

A high performance optical imaging system can be provided by minimizing the overlapping degree m, increasing the quantity of light of the rod lens array and improving the resolving power while taking into account the irregularity of the quantity of light when a dislocation between a sensor and an optical axis of an entire rod lens array occurs. In the optical imaging system, a plurality of rod lenses with a refractive index distribution in the radial direction are arranged in two rows in a rod lens array with their optical axes in parallel to each other. This optical imaging system focuses light from a manuscript plane onto an image plane, the planes being arranged on the two sides of the rod lens array. The overlapping degree m defined as the following equation (Eq. 10) is in a range of $0.91 \leq m \leq 1.01$;

$$m = X_0/2R \quad \text{(Eq. 10)}$$

wherein $X_0$ denotes an image radius that the rod lenses project onto the image plane and 2R denotes a distance between the optical axes of neighboring rod lenses.

13 Claims, 16 Drawing Sheets

OPTICAL IMAGING SYSTEM

FIELD OF THE INVENTION

The present invention relates to an optical imaging system used in an image transmission portion of an optical device, for example, a facsimile device, a copier, a printer, a scanner, or the like. More particularly, the present invention relates to an optical imaging system including a rod lens array, in which a plurality of rod lenses are arranged in an array.

BACKGROUND OF THE INVENTION

In an optical device, for example, a facsimile device, a copier, a printer, a scanner, or the like, to read out information on a manuscript plane by converting the information into an electrical signal, various kinds of scanning devices are used. One form of the scanning device is a contact type device. This contact type scanning device is formed by incorporating various parts including a lightening system, a rod lens array that is a one-to-one imaging device, a sensor, a cover glass (a transparent substrate), and the like, into one frame. In general, a manuscript is brought into contact with the surface of the cover glass and illuminated by the lighting system. The illuminated manuscript is imaged on the censor by the rod lens array and converted into an electric signal. Herein, the rod lens array is a one-to-one optical imaging system in which a plurality of rod lenses having a refractive index distribution in a radial direction are arranged in one row or two rows (see FIG. 2).

An example of a lens material used for a rod lens array includes glass, synthetic resin, or the like. A glass lens having a refractive index distribution is produced, for example, by an ion exchange method.

A single rod lens forms a one-to-one image within the range of a circle having a radius $X_0$ (field of view). The quantity of light is at the maximum on the optical axis and decreases with greater distance from the optical axis. Therefore, the distribution of the quantity of light in the longitudinal direction of a rod lens array has irregularity with the period corresponding to the distance between lenses. The magnitude of the irregularity of the quantity of light is defined as: 100 {(maximum quantity of light)-(minimum quantity of light)} /(minimum quantity of light) %, and determined by the overlapping degree m expressed by the following equation (Eq. 3):

$$m = X_0/2R \qquad (Eq. 3)$$

wherein 2R denotes the distance between the optical axes of neighboring rod lenses.

FIG. 15 shows a relationship between the overlapping degree m and the irregularity of the quantity of light, which are calculated by the below mentioned equation of the distribution of the quantity of light (Eq. 9), in a rod lens array in which a plurality of rod lenses are arranged in two rows. FIG. 15 shows the case of so-called "linear scanning method" using a very narrow range of light on the central axis of the image plane (see FIG. 2). As shown in FIG. 15, the irregularity of the quantity of light tends to decrease as the overlapping degree m is increased. However, the irregularity does not decrease monotonically. For example, at the points of m=0.91, 1.13, 1.37, 1.61, 1.85 . . . , the irregularity of the quantity of light takes on local minimum values. Since the irregularity of the quantity of light on the sensor should be as small as possible, when it is necessary particularly to minimize the irregularity of the quantity of light, the rod lens array is designed so that the overlapping degree m is approximate to the above-mentioned values. However, the irregularity of the quantity of light shown in FIG. 15 is the value when the sensor is arranged exactly on the central axis of the image plane. Therefore, in actual mass-produced scanning devices, it is inevitable that a dislocation between the sensor and the optical axis of an entire rod lens array occurs to some extent due to errors in dimensions of components or errors in assembling components. The dislocation of the sensor is defined as $\Delta X$ in FIG. 9. Accordingly, it is suggested that the device is designed so that the overlapping degree m is shifted somewhat from the above-mentioned local minimum values, in order to allow the irregularity of the quantity of light to fall within the range of not more than a certain level even if the dislocation of the sensor occurs to some extent (JP 11(1999)-14803A, JP11(1999)-64605A).

In general, even in the case of a rod lens array using rod lenses having the same optical characteristics, as the overlapping degree m becomes smaller, the brightness of the image plane is enhanced, and the resolution power is increased. FIG. 16 shows the relationship between the overlapping degree m and average brightness (in the case of a linear scanning) in a rod lens array in which a plurality of the same rod lenses are arranged in one row and in two rows. In FIG. 16, the brightness of the rod lens array is defined to be 100 when the overlapping degree m is 1.50 and the rod lenses are arranged in two rows in the rod lens array.

However, as the overlapping degree m is smaller, the irregularity of the quantity of light is increased. Thus, in a practical rod lens array, the overlapping degree m is 1.3 or more in the case of a rod lens array in which the rod lenses are arranged in two rows. For example, the lower limit of the overlapping degree m is set to be 1.36 in the rod lens array in which the rod lenses are arranged in two rows by Nippon Sheet Glass Co., Ltd. According to a disclosure of JP11 (1999)-14803A, the desirable overlapping degree m is set to be in the range of $1.46 \leq m \leq 1.64$.

Recently, to provide high speed for a facsimile device, a scanner, or the like, a brighter rod lens array has been demanded.

SUMMARY OF THE INVENTION

It is an object of the present invention to provide a high performance optical imaging system by minimizing the overlapping degree m, increasing the quantity of light of the rod lens array and improving the resolving power while taking into account the irregularity of the quantity of light when a dislocation between a sensor and an optical axis of an entire rod lens array occurs.

In order to achieve the above-mentioned object, the configuration of the optical imaging system for focusing light from a manuscript plane onto an image plane according to the present invention includes a rod lens array having a plurality of rod lenses with a refractive index distribution in a radial direction that are arranged in two rows so that their optical axes are in parallel to each other. An overlapping degree m expressed by the following equation (Eq. 4) is in a range of $0.91 \leq m \leq 1.01$;

$$m = X_0/2R \qquad (Eq. 4)$$

wherein 2R denotes a distance between the optical axes of neighboring rod lenses and $X_0$ denotes an image radius that the rod lenses project onto the image plane.

According to such a configuration of the optical imaging system, it is possible to obtain a high performance optical imaging system in which a quantity of light is increased and the resolution power is improved.

Furthermore, in the configuration of the optical imaging system of the present invention, it is preferable that the overlapping degree m is in the range of $0.93 \leq m \leq 0.97$.

Furthermore, in the configuration of the optical imaging system of the present invention, it is preferable that R is in the range of $0.05\text{mm} \leq R \leq 0.60$ mm. When R is less than 0.05 mm, production of the rod lens array becomes difficult from the practical viewpoint (for example, handling becomes extremely difficult). When R is more than 0.60 mm, the entire rod lens array becomes large, it is difficult to downsize the entire optical imaging system.

Furthermore, in the configuration of the optical imaging system of the present invention, it is preferable that a radius $r_0$ of a portion functioning as a lens of the rod lenses is in the range of $0.50\,R \leq r_0 \leq 1.0\,R$. When $r_0$ is less than $0.50\,R$, the brightness of the image is remarkably reduced. Therefore, it is needless to say that the maximum $r_0$ is equal to R.

Furthermore, in the configuration of the optical imaging system of the present invention, it is preferable that a shading mask having an approximately rectangular shaped opening portion opening along the longitudinal direction of the rod lens array is arranged on at least one side of the rod lens array. According to such a preferable configuration, it is possible to reduce the irregularity of the quantity of light. Furthermore, in this case, it is preferable that the opening portion of the shading mask is symmetric to the central axis in the longitudinal direction of the lens surface of the rod lens array. Furthermore, it is preferable that a half width W of the opening portion of the shading mask is in the range of $(\sqrt{3}/2)R+0.1\,r_0 \leq W \leq (\sqrt{3}/2)\,R+0.6\,r_0$, wherein $r_0$ denotes a radius of a portion functioning as a lens of the rod lenses. When the half width W of the opening portion of the shading mask is less than $(\sqrt{3}/2)\,R+0.1\,r_0$, the quantity of light is much lowered. When the half width W is more than $(\sqrt{3}/2)\,R+0.6\,r_0$, no significant improvement of the irregularity of the quantity of light is realized.

Furthermore, in the configuration of the optical imaging system of the present invention, it is preferable that the refractive index distribution of the rod lenses is expressed by the following equation (Eq. 5);

$$n(r)^2 = n_0^2 \cdot \{1-(g\cdot r)^2 + h_4\cdot(g\cdot r)^4 + h_6\cdot(g\cdot r)^6 + h_8\cdot(g\cdot r)^8 + \ldots\} \quad \text{(Eq. 5)}$$

wherein r denotes a radial distance from an optical axis of the rod lenses, $n_0$ denotes a refractive index at the optical axis of the rod lenses, and g, $h_4$, $h_6$ and h8 denote coefficients of the refractive index distribution. Furthermore, in this case, it is preferable that the refractive index $n_0$ at the optical axis of the rod lenses is in the range of $1.4 \leq n_0 \leq 1.8$. Furthermore, in this case, it is preferable that a product $n_0 \cdot g \cdot r_0$ is in the range of $0.05 \leq n_0 \cdot g \cdot r_0 \leq 0.50$, wherein $r_0$ denotes a radius of a portion functioning as a lens of the rod lenses. According to such a preferable configuration, it is easy to produce rod lenses. Furthermore, in this case, it is preferable that $Z_0/P$ is in the range of $0.5 < Z_0/P < 1.0$, wherein $Z_0$ denotes a length of the rod lens and $P=2\pi/g$ denotes a one-pitch length of the rod lenses. According to such a preferable configuration, an erected image can be obtained.

Furthermore, in the configuration of the optical imaging system of the present invention, it is preferable that a parallel plane transparent substrate is arranged so that the manuscript plane is positioned at a front focal position of the rod lens array. According to such a preferable configuration, the manuscript plane can be set at the front focal position just by pressing the manuscript to the surface of the transparent substrate. In this case, it is preferable that the parallel plane transparent substrate is in contact with the lens surface of the rod lens array. This easily can be realized by adjusting the thickness of the transparent substrate. According to such a preferable configuration, the adjustment of the distance between the rod lens array and the front focal position can be simplified, which makes the assembly of the optical imaging system cheaper.

DESCRIPTION OF THE PREFERRED EMBODIMENTS

The following is a more detailed description of the embodiments of the present invention.

(First Embodiment)

Figure 1:
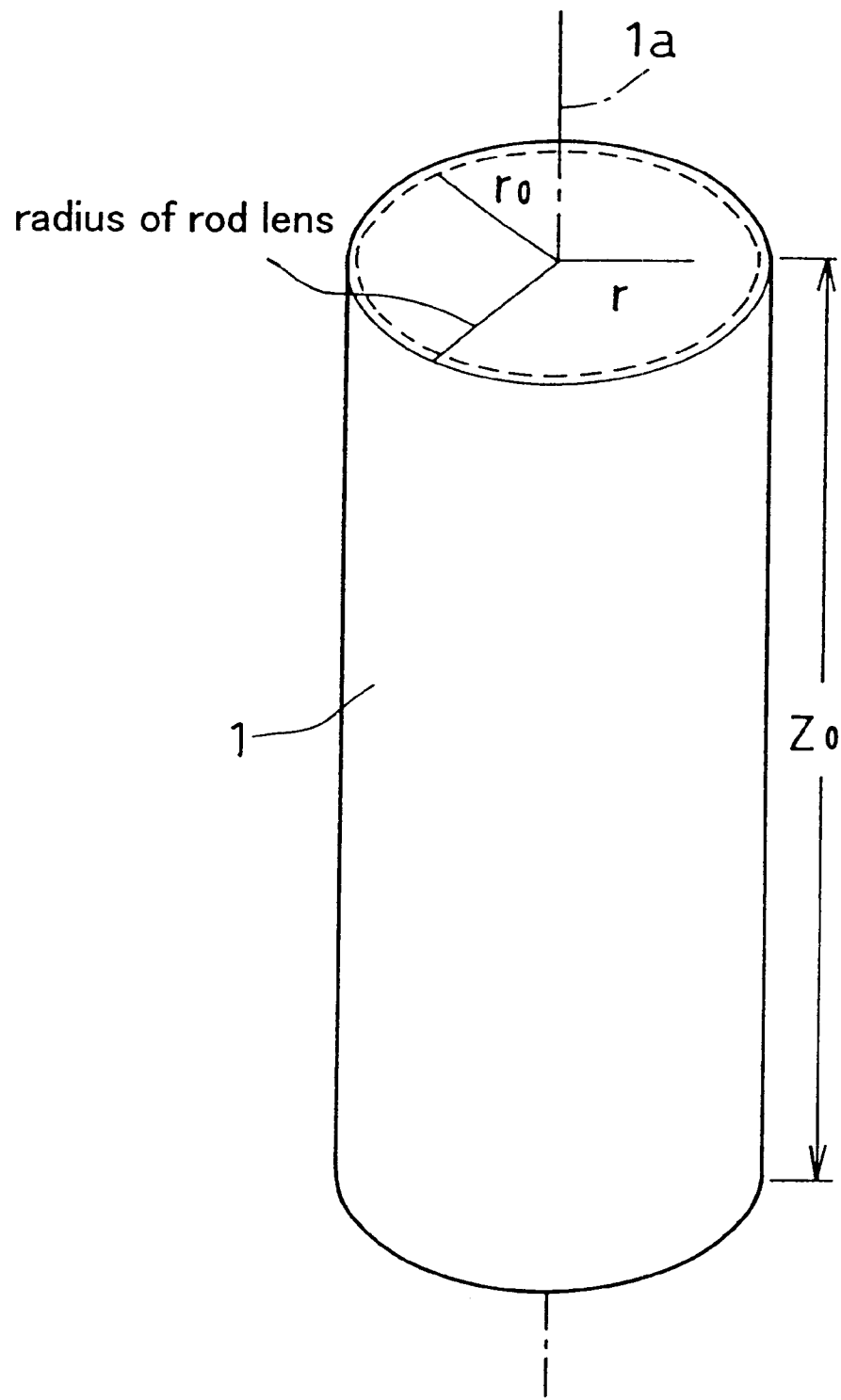
FIG. 1 is a perspective view showing a rod lens used in an optical imaging system according to the present invention.
Figure 2:
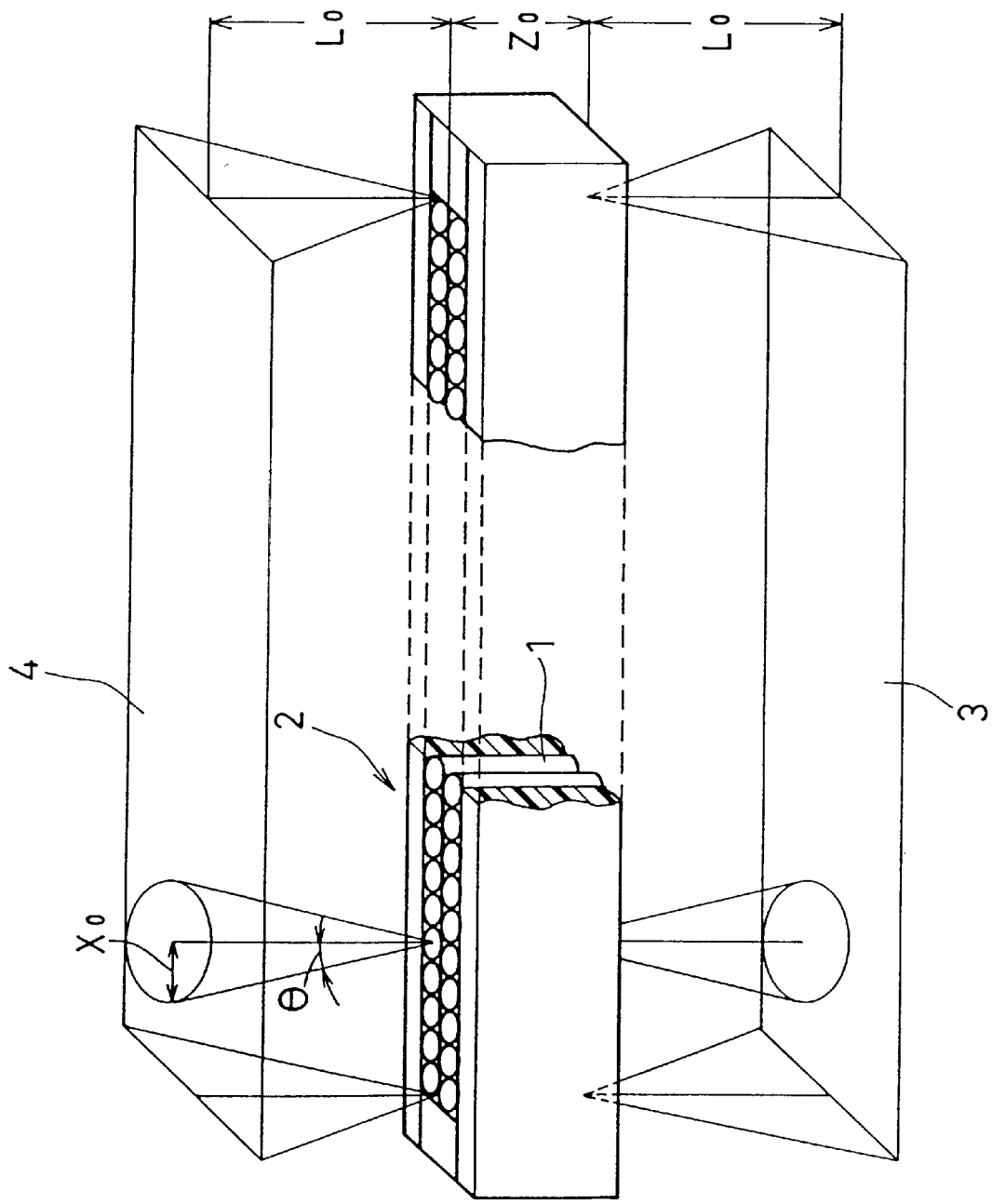
FIG. 2 is a perspective view showing an optical imaging system according to the present invention.

In this embodiment, as is shown in FIGS. 1 and 2, a plurality of columnar rod lenses 1 with a refractive index distribution in the radial direction are arranged in two rows in a rod lens array 2 for one-to-one imaging with their optical axes 1a in parallel to each other. This optical imaging system focuses light from a manuscript plane 3 onto an image plane 4, the planes being arranged on the two sides of the rod lens array 2.

Figure 3:
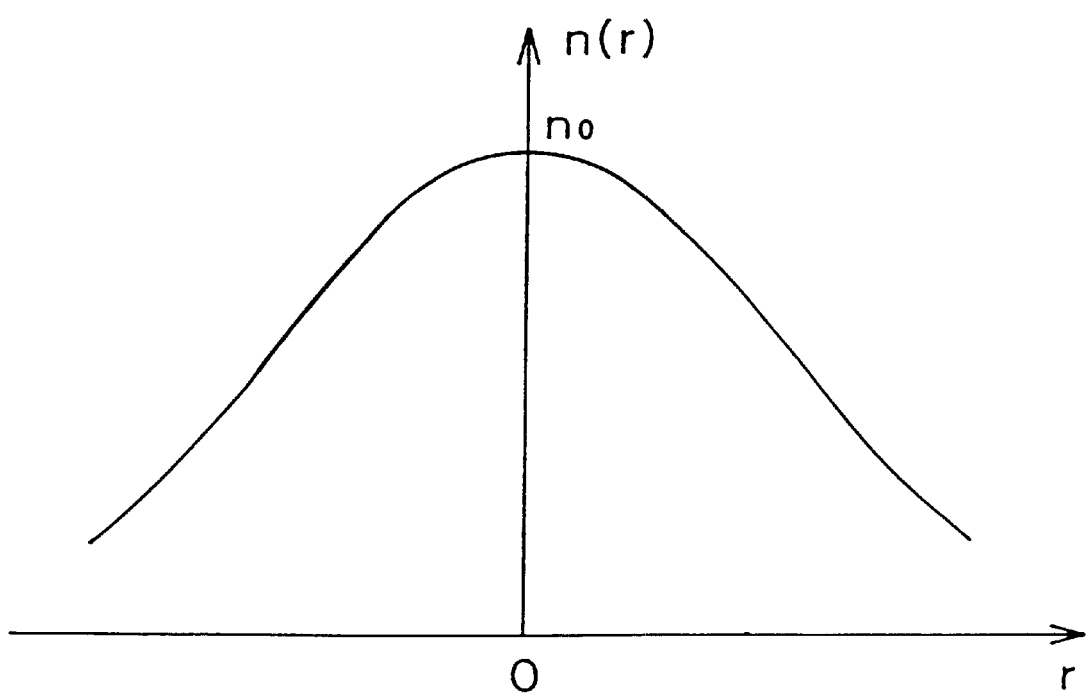
FIG. 3 is a graph showing a refractive index distribution curve of the rod lenses used in the optical imaging system according to the present invention.

As is shown in FIG. 3, the refractive index n of the rod lenses 1 has a distribution in the radial direction. The refractive index distribution is expressed by the following equation (Eq. 6);

$$n(r)^2 = n_0^2 \cdot \{1-(g \cdot r)^2 + h_4 \cdot (g \cdot r)^4 + h_6 \cdot (g \cdot r)^6 + h_8 \cdot (g \cdot r)^8 + \ldots\} \quad \text{(Eq. 6)}$$

wherein r is a radial distance from an optical axis 1a of the rod lenses 1, n(r) is the refractive index at the radial distance r from the optical axis 1a of the rod lens 1, $n_0$ is the refractive index at the optical axis 1a of the rod lenses 1 (central refractive index), and g, $h_4$, $h_6$ and $h_8$ are coefficients of the refractive index distribution.

Figure 4:
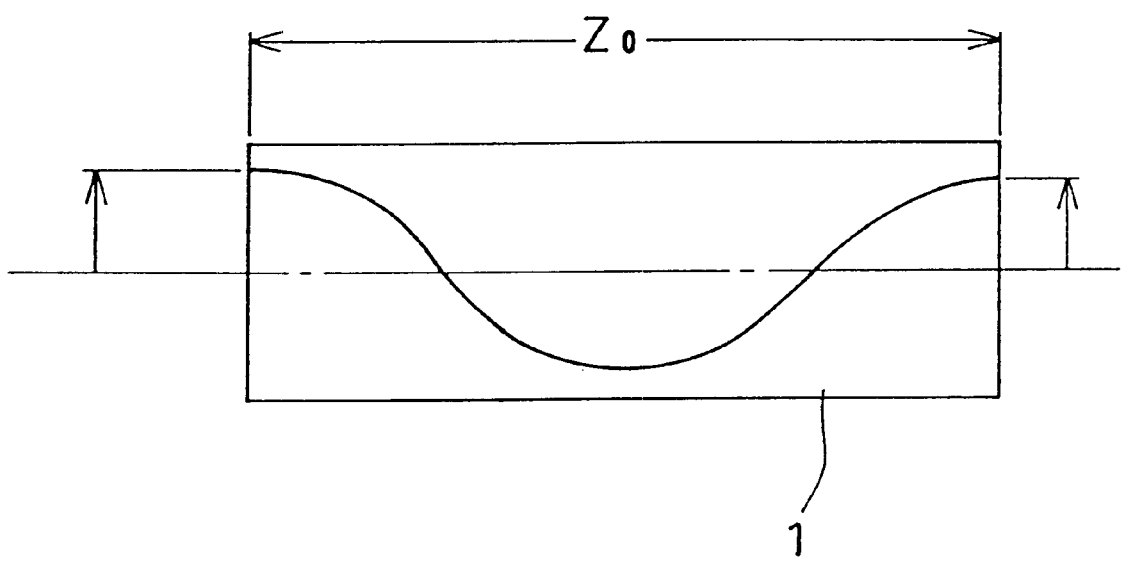
FIG. 4 is a schematic drawing to illustrate the image-formation with a rod lens used in the optical imaging system according the present invention.

To attain erected images as shown in FIG. 4, the ratio $Z_0/P$ has to be in the range of $0.5 \leq Z_0/P < 1.0$, wherein $Z_0$ denotes a length of the rod lenses 1 and $P = 2\pi/g$ denotes a one-pitch length of the rod lenses 1.

The distance $L_0$ between the edge (lens surface) of the rod lens array 2 and the manuscript plane 3 and the distance $L_0$ between the edge (lens surface) of the rod lens array 2 and the image plane 4 (see FIG. 2) are expressed by the following equation (Eq. 7);

$$L_0 = -\{1/(n_0 \cdot g)\} \cdot \tan(Z_0 \pi/P). \quad \text{(Eq. 7)}$$

It is desirable that R is in a range of 0.05 mm $\leq R \leq$ 0.60 mm, wherein 2R denotes the distance between the optical axes of neighboring rod lenses 1.

Furthermore, it is desirable that the radius $r_0$ of the effective lens portion of the rod lenses 1, that is, the radius $r_0$ of the portion functioning as a lens, is in a range of 0.50 R $\leq r_0 \leq$ 1.0 R.

When the neighboring rod lenses 1 are in contact with each other and the radius $r_0$ of the portion functioning as a lens is equal to the radius of the lens, $r_0$ is equal to R. However, due to the assembly process of the rod lens array, rod lenses 1 are arranged somewhat separated from each other, or in order to shade at the periphery portion of the rod lenses 1 having a bad refractive index distribution, the periphery portion of the rod lenses 1 are made to be opaque. In this case, $r_0$ is not equal to R.

When R is less than 0.05 mm, production of the rod lens array 2 becomes difficult from the practical viewpoint (for example, handling becomes extremely difficult). When R is more than 0.60 mm, the entire rod lens array 2 becomes large, it is difficult to downsize the entire optical imaging system.

Furthermore, when $r_0$ is less than 0.50 R, the brightness of the image is remarkably reduced. Therefore, it is needless to say that the maximum $r_0$ is equal to R.

The brightness of the rod lenses 1 depends on the aperture angle $\theta = n_0 \cdot g \cdot r_0$ (rad), which is an angle indicating the range over which the lenses can accept light. As the aperture angle $\theta$ is larger, a brighter image can be obtained.

In order to use the rod lenses 1 for the one-to-one optical imaging system, it is desirable that the aperture angle $\theta$ is 0.05 or more. Furthermore, the rod lenses 1 having the aperture angle $\theta$ of more than 0.05 are difficult to produce, since the content of the component (for example, $Tl_2O$, $Li_2O$, etc. for glass lens) for forming the refractive index distribution is limited. Therefore, it is desirable that the aperture angle $\theta = n_0 \cdot g \cdot r_0$ is in the range of $0.05 \leq n_0 \cdot g \cdot r_0 \leq 0.50$.

It is desirable that the refractive index $n_0$ at the optical axis 1a of the rod lenses 1 (central refractive index) is large because the aperture angle $\theta$ is increased when the refractive index $n_0$ is larger. For example, in the case of a glass lens, a large amount of univalent cationic components is contained, the realizable value of $n_0$ is in the range of $1.4 \leq n_0 \leq 1.8$.

Figure 5:
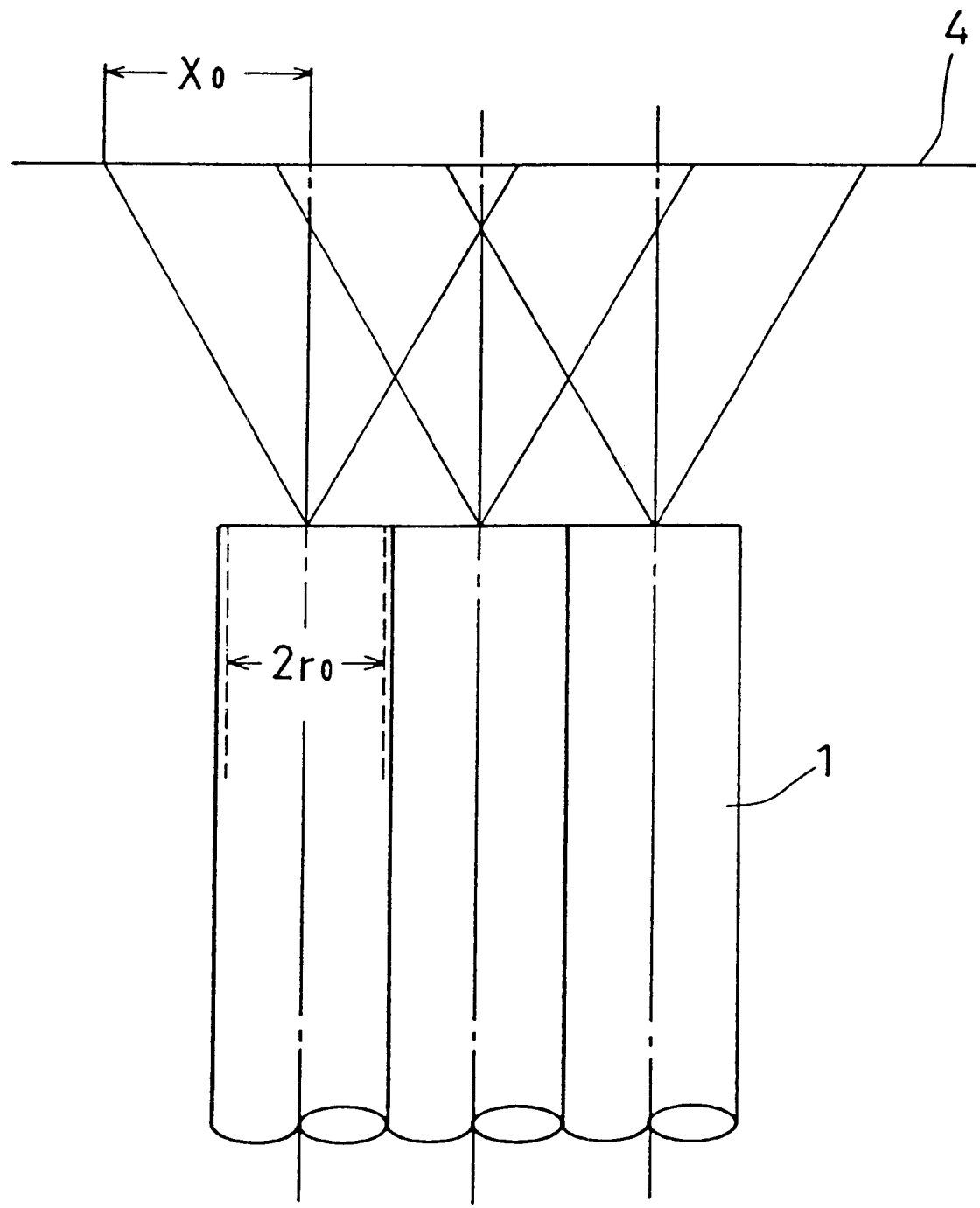
FIG. 5 is a schematic drawing of an image composition by a plurality of rod lenses used in the optical imaging system according to the present invention.

In an optical imaging system provided with such a rod lens array 2, a compound image is formed by a plurality of rod lenses 1 on the image plane 4, as is shown in FIG. 5, so that it is convenient to introduce a dimensionless factor describing the amount of overlap, that is, the so-called "overlapping degree". This overlapping degree m is expressed by the following equation (Eq. 8):

$$m = X_0/2R \quad \text{(Eq. 8)}$$

wherein $X_0$ is the image radius (field of view) that a single rod lens 1 projects onto the image plane 4 and is defined as $X_0 = -r_0/\cos(Z_0 \pi/P)$.

Figure 6:
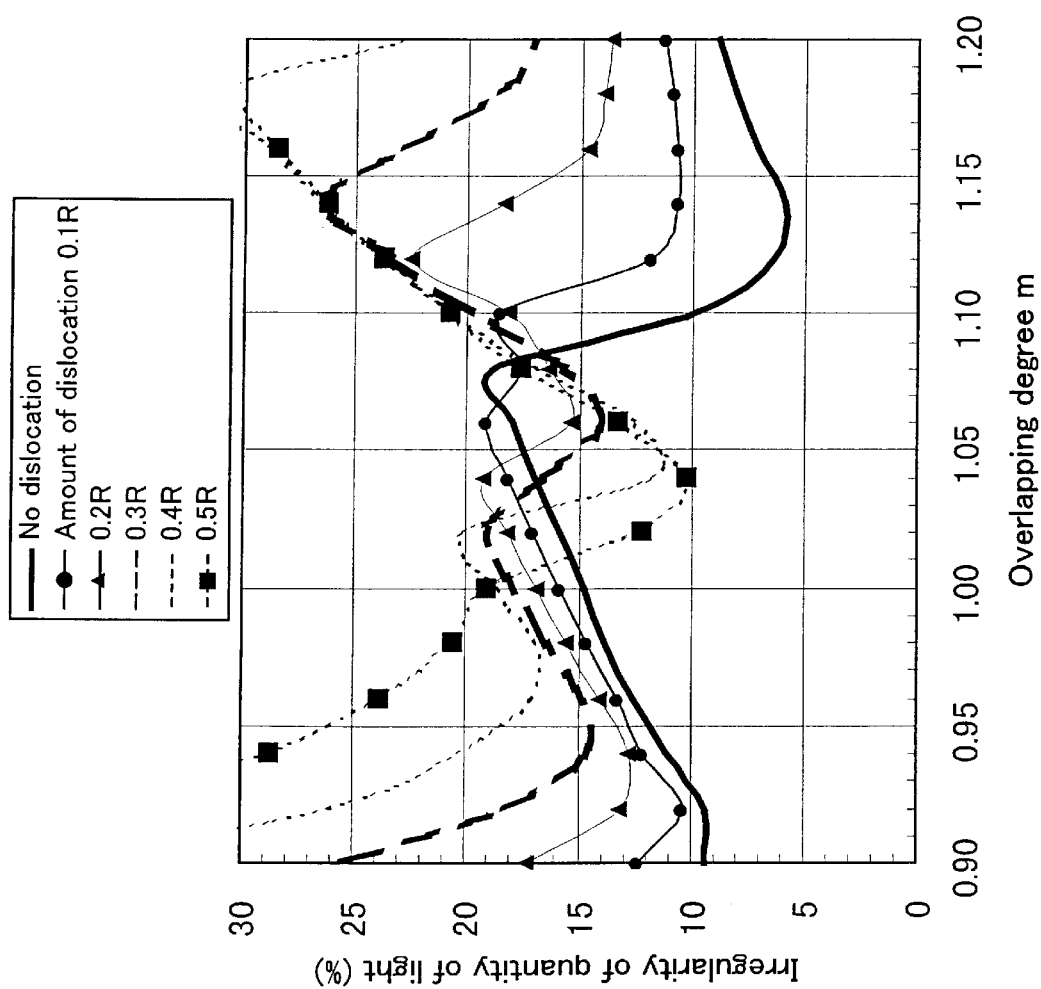
FIG. 6 is a graph showing a relationship between an irregularity of the quantity of light and an overlapping degree when a dislocation between a sensor and an optical axis of an entire rod lens array occurs in the optical imaging system according to the present invention.

FIG. 6 shows the relationship between the overlapping degree m and the irregularity of the quantity of light when the overlapping degree m is varied in the range of 0.90 to 1.20.

The irregularity of the quantity of light when a dislocation between a sensor and an optical axis of an entire rod lens array 2 occurs can be calculated by the use of the following equation (Eq. 9) representing the distribution of the quantity of light in the image radius (field of view) $X_0$:

$$E(X) = E_0 \cdot \{1 - (X/X_0)^2\}^{0.5} \quad \text{(Eq. 9)}$$

wherein $E_0$ denotes a quantity of light on the optical axis, X denotes a distance from the optical axis, and E(X) denotes a quantity of light when the distance from the optical axis is X.

Figure 9:
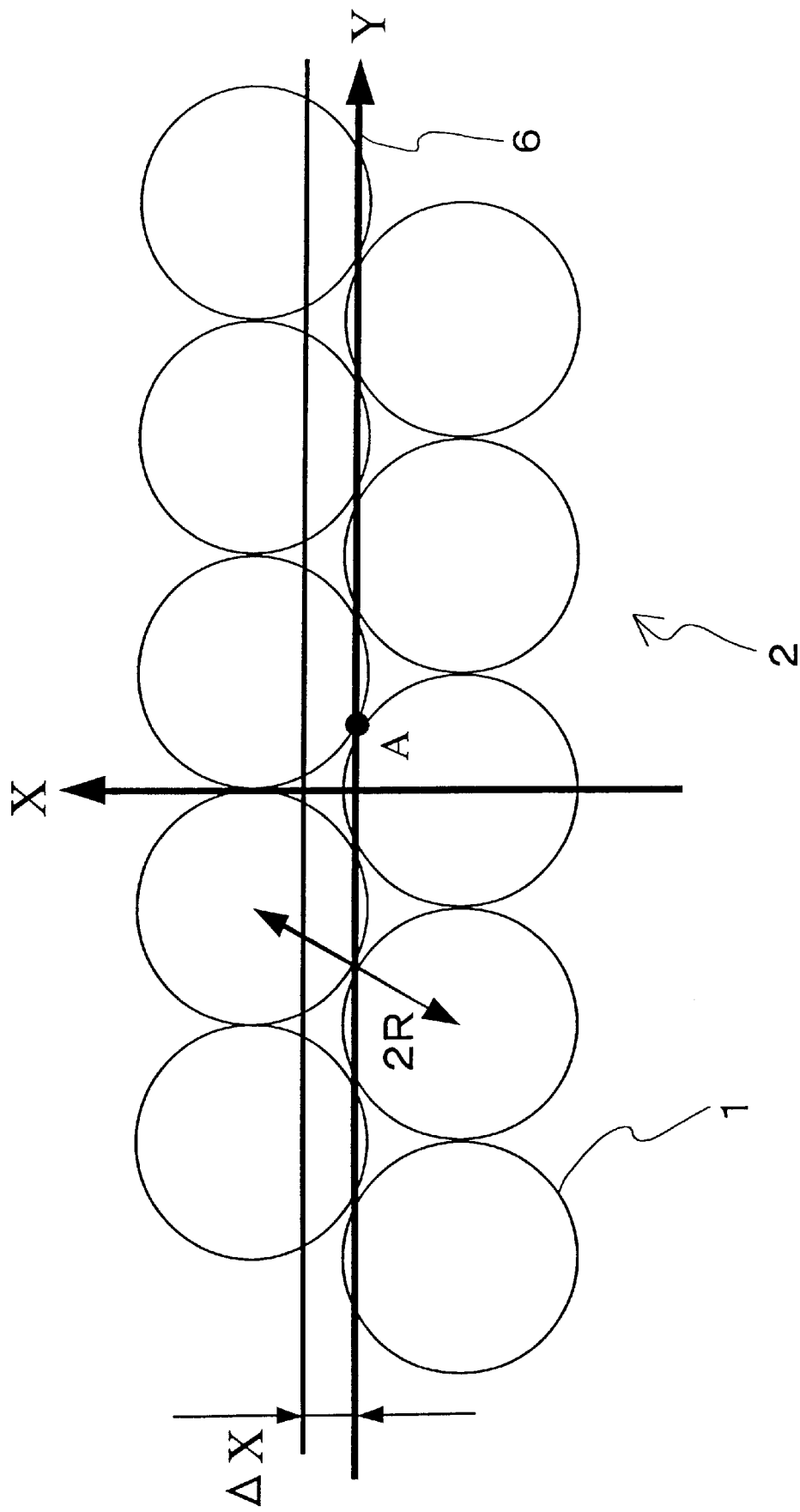
FIG. 9 is a diagram to explain the amount of a dislocation ΔX of a sensor in the optical imaging system according to the present invention.

As shown in FIG. 6, for example, when m is 1.13, the irregularity of the quantity of light is minimized on the central axis (reference 6 in FIG. 9). However, when the dislocation between the sensor and the optical axis of the entire rod lens array 2 occurs, the irregularity of the quantity of light is increased rapidly. On the other hand, when m is 0.94, the irregularity of the quantity of light on the central axis is somewhat large, however, the irregularity of the quantity of light remains relatively low even if the dislocation between the sensor and the optical axis of the entire rod lens array 2 becomes large. That is, when m is 0.94, the irregularity of the quantity of light is not affected significantly by the dislocation between the sensor and the optical axis of the entire rod lens array 2.

The acceptable irregularity of the quantity of light in a scanning device is at most 20%. In some applications of use, it is desirably 15% or less. Furthermore, it is desirable that the margin for the amount of the dislocation occurring during the assembly is secured to be about ±0.1 mm. In order to satisfy this requirement, in the case of the rod lens array of R=0.5 mm, it is desirable that the acceptable range for the amount of the dislocation is secured to be 0.3 R or more.

Therefore, as shown in FIG. 6, when the irregularity of the quantity of light is actually negligible, that is, "when the amount of the dislocation is 0, the irregularity of the quantity of light is 15% or less, when the amount of the dislocation is in the range of 0.3 R or less, the irregularity of the quantity of light is 20% or less," the overlapping degree m is preferably in the range of $0.91 \leq m \leq 1.01$. Furthermore, "when the amount of the dislocation is the range of 0.3 R or less, the irregularity of the quantity of light is approximately 15% or less," the overlapping degree m is preferably in the range of $0.93 \leq m \leq 0.97$.

The values of higher-order coefficients of the refractive index distribution $h_4$, $h_6$, $h_8$, . . . of 4th-order or more affect the spherical aberration and field curvature. Therefore, it is necessary to select the values of $h_4$, $h_6$, $h_8$, . . . in accordance with the conditions of the rod lens array so that the average resolution power is optimum.

Figure 7A:
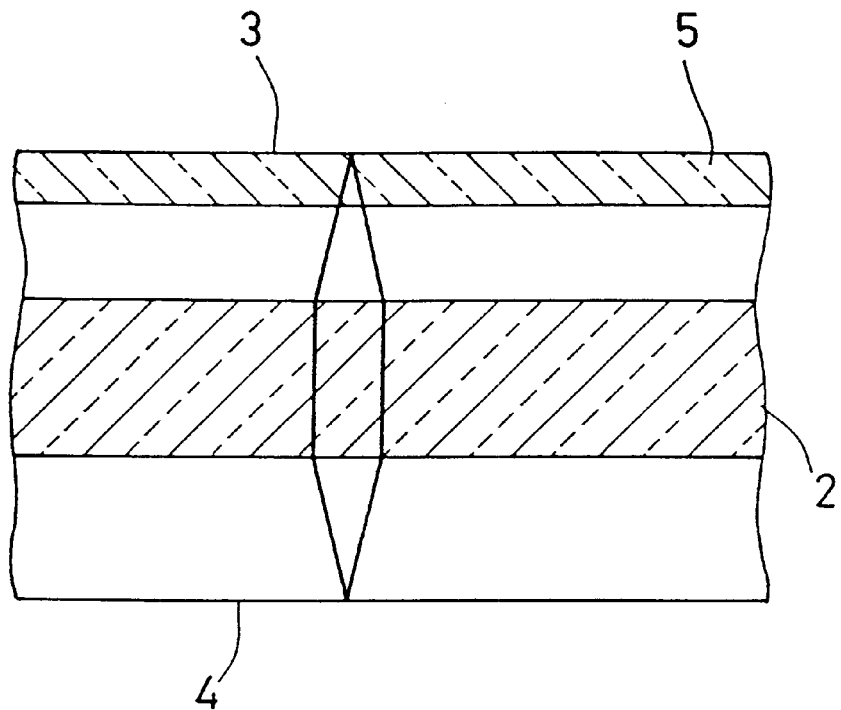
FIG. 7 is a cross sectional view showing an optical imaging system provided with a parallel plane transparent substrate.
Figure 7B:
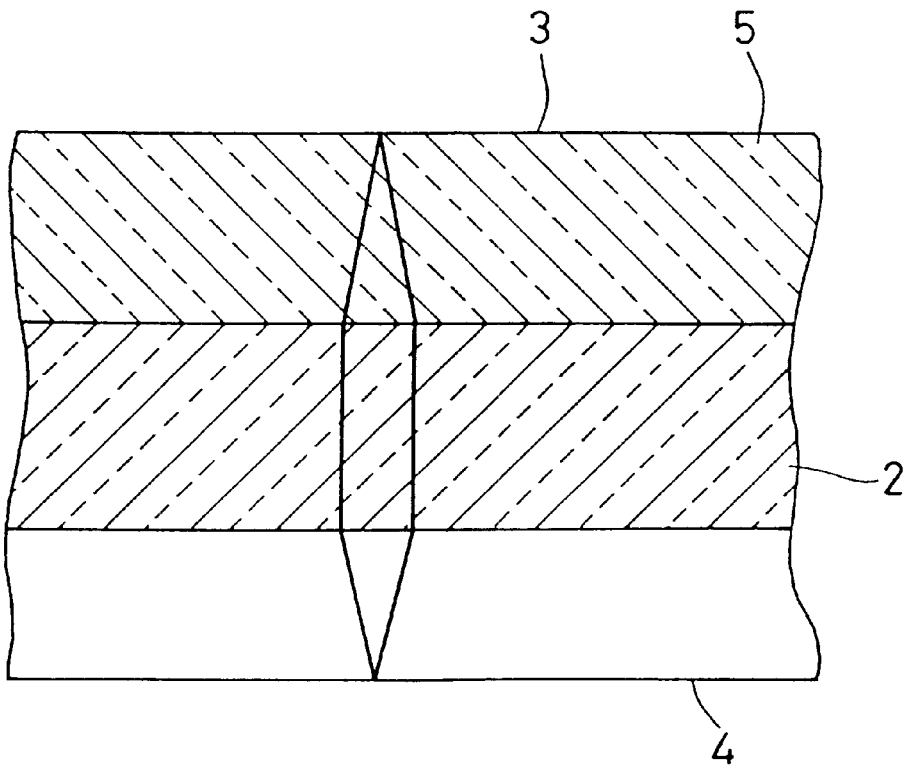

In the above-mentioned configuration, as shown in FIG. 7A, it is desirable that a transparent substrate (cover glass) 5 having the parallel plane surface is arranged in a manner that the manuscript plane 3 is located at the front focal position of the rod lens array 2. According to such a configuration, the manuscript plane 3 can be set at the front focal position just by putting the manuscript on the surface of the transparent substrate 5. Furthermore, in this case, as shown in FIG. 7B, it is desirable that the parallel plane transparent substrate (cover glass) 5 is brought into contact with the lens surface of the rod lens array 2. This can be easily realized by adjusting the thickness of the transparent substrate (cover glass) 5. According to such a configuration, the adjustment of the distance between the rod lens array 2 and the front focal position can be simplified, which makes the assembly of the optical imaging system cheaper.

First Example

Hereinafter, the present invention is described in detail with reference to the specific Examples. The following Examples and Comparative Examples use a rod lens array in which a plurality of columnar rod lenses having a refractive index distribution in the radial direction are arranged in two rows for one-to-one imaging with their optical axes in parallel to each other.

The brightness and irregularity of the quantity of light were calculated by the use of the equation of the distribution of the quantity of light for a single rod lens (see Eq. 9 mentioned above). Furthermore, the modulation transfer function (MTF) values were calculated by the use of the optical design software "Oslo Six" by Sinclair Optics (US).

Figure 8:
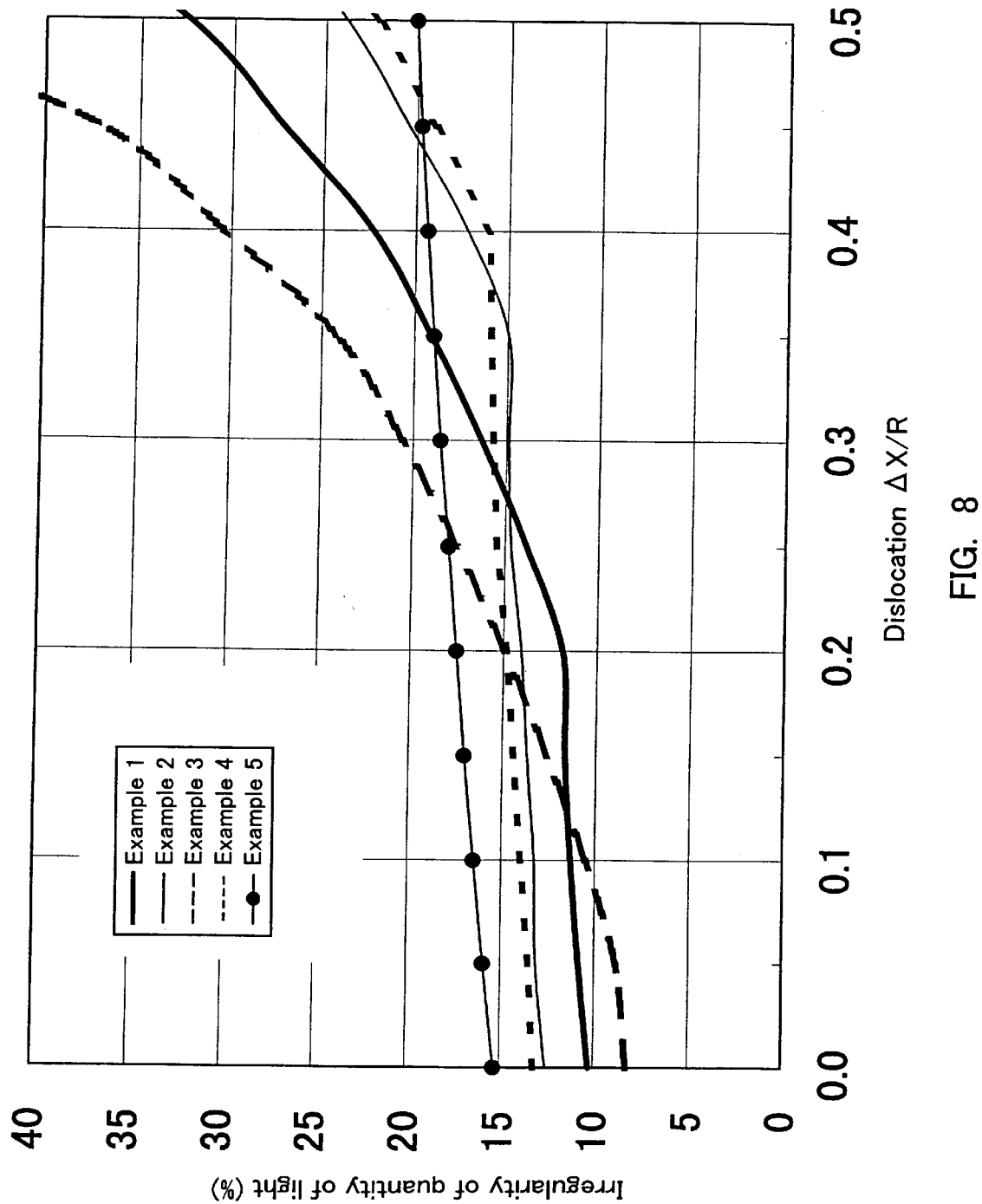
FIG. 8 is a graph showing a relationships between an irregularity of the quantity of light and a dislocation between a sensor and an optical axis of an entire rod lens array in various Examples 1 to 5 according to the present invention.

In Example 1, the distance 2 R between the optical axes of neighboring rod lenses is 1.085 mm, and the overlapping degree m is 0.930. Specific set values are shown in Table 1, and the irregularity of the quantity of light when the amount of the dislocation is $\Delta X$ is shown in FIG. 8. The MTF values shown in Table 1 are for a 12 line-pairs/mm pattern and a 24 line-pairs/mm pattern. The values are calculated values in the directions of X and Y at the point of A shown in FIG. 9. As shown in FIG. 8, when the amount of the dislocation $\Delta X$ is within the range of 0.28 R (corresponding to 0.15 mm) or less, the irregularity of the quantity of light is a practical value of 15% or less.

In Example 2, the distance 2 R between the optical axes of neighboring rod lenses is 0.300 mm, and the overlapping degree m is 0.960. Specific set values are shown in Table 1, and the irregularity of the quantity of light when the amount of the dislocation is $\Delta X$ is shown in FIG. 8. As shown in FIG. 8, when the amount of the dislocation $\Delta X$ is within the range of 0.35 R (corresponding to 0.053 mm) or less, the irregularity of the quantity of light is a practical value of 15% or less. Since the acceptable range of amount of the dislocation is in proportion to R, it is necessary to enhance the assembly precision in Example 2 more than Example 1 wherein R is large.

In Example 3, the distance 2 R between the optical axes of neighboring rod lenses is 0.900 mm, and the overlapping degree m is 0.910. Specific set values are shown in Table 2, and the irregularity of the quantity of light when amount of the dislocation is $\Delta X$ is shown in FIG. 8. As shown in FIG. 8, when amount of the dislocation $\Delta X$ is within the range of 0.20 R (corresponding to 0.09 mm) or less, the irregularity of the quantity of light is a practical value of 15% or less.

In Example 4, the distance 2 R between the optical axes of neighboring rod lenses is 0.100 mm, and the overlapping degree m is 0.970. Specific set values are shown in Table 2, and the irregularity of the quantity of light when the amount of the dislocation is $\Delta X$ is shown in FIG. 8. As shown in FIG. 8, when the amount of the dislocation $\Delta X$ is within the range of 0.40 R (corresponding to 0.02 mm) or less, the irregularity of the quantity of light is a practical value of 16% or less.

In Example 5, the distance 2 R between the optical axes of neighboring rod lenses is 0.600 mm, and the overlapping degree m is 1.010. Specific set values are shown in Table 3, and the irregularity of the quantity of light when the amount of the dislocation is $\Delta X$ is shown in FIG. 8. As shown in FIG. 8, even if the amount of the dislocation $\Delta X$ is 0, the irregularity of the quantity of light is more than 15%. However, in the wide range wherein the amount of the dislocation $\Delta X$ is within the range of 0.50 R (corresponding to 0.15 mm) or less, the irregularity of the quantity of light is 20% or less. This may be practical value depending upon the applications of use.

TABLE 1

|  | Example 1 | Example 2 |
| --- | --- | --- |
| Design wavelength | 570 nm | 570 nm |
| Center refractive index $n_0$ | 1.614 | 1.639 |
| Coefficient of refractive index distribution g | 0.23262 mm$^{-1}$ | 1.56181 mm$^{-1}$ |
| Coefficient of refractive index distribution $h_4$ | +1 | +1 |
| Coefficient of refractive index distribution $h_6$ | 0 | −4 |
| Effective radius of lens $r_0$ | 0.5425 mm | 0.150 mm |
| $n_0 \cdot g \cdot r_0$ | 0.20368 | 0.38397 |
| Length of lens $Z_0$ | 18.386 mm | 2.713 mm |
| $Z_0/P$ | 0.6807 | 0.6744 |
| Distance between lenses 2R | 1.085 mm | 0.300 mm |
| $r_0/R$ | 1.00 | 1.00 |
| Distance between lens and image L | 4.1768 mm | 0.6403 mm |
| Radius of field of view $X_0$ | 1.0090 mm | 0.28801 mm |
| Overlapping degree m | 0.930 | 0.960 |
| MTF(%) 12-1 p/mm |  |  |
| Y-direction | 94.4% | 96.7% |
| X-direction | 95.7% | 97.0% |
| MTF(%) 24-1 p/mm |  |  |
| Y-direction | 82.4% | 87.5% |
| X-direction | 84.8% | 88.7% |

TABLE 2

|  | Example 3 | Example 4 |
| --- | --- | --- |
| Design wavelength | 570 nm | 570 nm |
| Center refractive index $n_0$ | 1.450 | 1.700 |
| Coefficient of refractive index distribution g | 0.15000 mm$^{-1}$ | 3.50000 mm$^{-1}$ |
| Coefficient of refractive index distribution $h_4$ | 0 | 0 |
| Coefficient of refractive index distribution $h_6$ | 0 | 0 |
| Effective radius of lens $r_0$ | 0.4000 mm | 0.050 mm |
| $n_0 \cdot g \cdot r_0$ | 0.0870 | 0.2975 |

TABLE 2-continued

|  | Example 3 | Example 4 |
|---|---|---|
| Length of lens $Z_0$ | 27.75 mm | 1.207 mm |
| $Z_0/P$ | 0.6625 | 0.6724 |
| Distance between lenses 2R | 0.900 mm | 0.100 mm |
| $r_0/R$ | 0.889 | 1.00 |
| Distance between lens and image L | 8.2108 mm | 0.2795 mm |
| Radius of field of view $X_0$ | 0.8187 mm | 0.09702 mm |
| Overlapping degree m | 0.910 | 0.970 |
| MTF(%) 12-1 p/mm |  |  |
| Y-direction | 88.2% | 95.8% |
| X-direction | 87.2% | 95.2% |
| MTF(%) 24-1 p/mm |  |  |
| Y-direction | 77.1% | 84.1% |
| X-direction | 77.4% | 82.2% |

TABLE 3

|  | Example 5 |
|---|---|
| Design wavelength | 570 nm |
| Center refractive index $n_0$ | 1.800 |
| Coefficient of refractive index distribution g | 1.000 mm$^{-1}$ |
| Coefficient of refractive index distribution $h_4$ | +1 |
| Coefficient of refractive index distribution $h_6$ | −2 |
| Effective radius of lens $r_0$ | 0.270 mm |
| $n_0 \cdot g \cdot r_0$ | 0.468 |
| Length of lens $Z_0$ | 4.065 mm |
| $Z_0/P$ | 0.6470 |
| Distance between lenses 2R | 0.600 mm |
| $r_0/R$ | 0.900 |
| Distance between lens and image L | 1.1165 mm |
| Radius of field of view $X_0$ | 0.60610 mm |
| Overlapping degree m | 1.010 |
| MTF(%) 12-1 p/mm |  |
| Y-direction | 61.9% |
| X-direction | 65.9% |
| MTF(%) 24-1 p/mm |  |
| Y-direction | 36.0% |
| X-direction | 35.3% |

In Comparative Example 1, the rod lenses having the same optical characteristics as Example 1 were used, and the overlapping degree m was set to be 1.43. Furthermore, in Comparative Example 2, the rod lenses having the same optical characteristics as Example 2 were used, and the overlapping degree m was set to be 1.50. Specific values of Comparative Examples 1 and 2 are shown in Table 4.

TABLE 4

|  | Co. Ex. 1 | Co. Ex. 2 |
|---|---|---|
| Design wavelength | 570 nm | 570 nm |
| Center refractive index $n_0$ | 1.614 | 1.639 |
| Coefficient of refractive index distribution g | 0.23262 mm$^{-1}$ | 1.56181 mm$^{-1}$ |
| Coefficient of refractive index distribution $h_4$ | +1 | +1 |
| Coefficient of refractive index distribution $h_6$ | 0 | −4 |
| Effective radius of lens $r_0$ | 0.5425 mm | 0.150 mm |
| $n_0 \cdot g \cdot r_0$ | 0.20368 | 0.38397 |
| Length of lens $Z_0$ | 16.576 mm | 2.447 mm |
| $Z_0/P$ | 0.6137 | 0.6083 |
| Distance between lenses 2R | 1.085 mm | 0.300 mm |
| $r_0/R$ | 1.00 | 1.00 |
| Distance between lens and image L | 7.1379 mm | 1.1041 mm |
| Radius of field of view $X_0$ | 1.5518 mm | 0.44969 mm |
| Overlapping degree m | 1.430 | 1.500 |
| MTF(%) 12-1 p/mm |  |  |
| Y-direction | 82.7% | 93.5% |
| X-direction | 82.3% | 94.0% |
| MTF(%) 12-1 p/mm |  |  |
| Y-direction | 59.7% | 76.7% |
| X-direction | 56.1% | 77.9% |
| Brightness | 75.4 (with respect to 100 of Example 1) | 73.6 (with respect to 100 of Example 2) |

Co. Ex. = Comparative Example

"Brightness" in Table 4 refers to an average quantity of light in the direction of the Y-axis in a case where no dislocation occurs. The brightness of Examples to which they respectively correspond are defined as 100.

In Comparative Examples 1 and 2, the brightness and MTF value are inferior to the corresponding Examples 1 and 2. This shows that the quantity of light and resolving power can be improved according to the present invention.

(Second Embodiment)

In this embodiment, by setting the overlapping degree m in the range of $0.91 \leq m \leq 1.01$, the average quantity of light is increased as compared with those of conventional art, and the irregularity of the quantity of light is reduced by masking the lens surface of the rod lens array.

Figure 10:
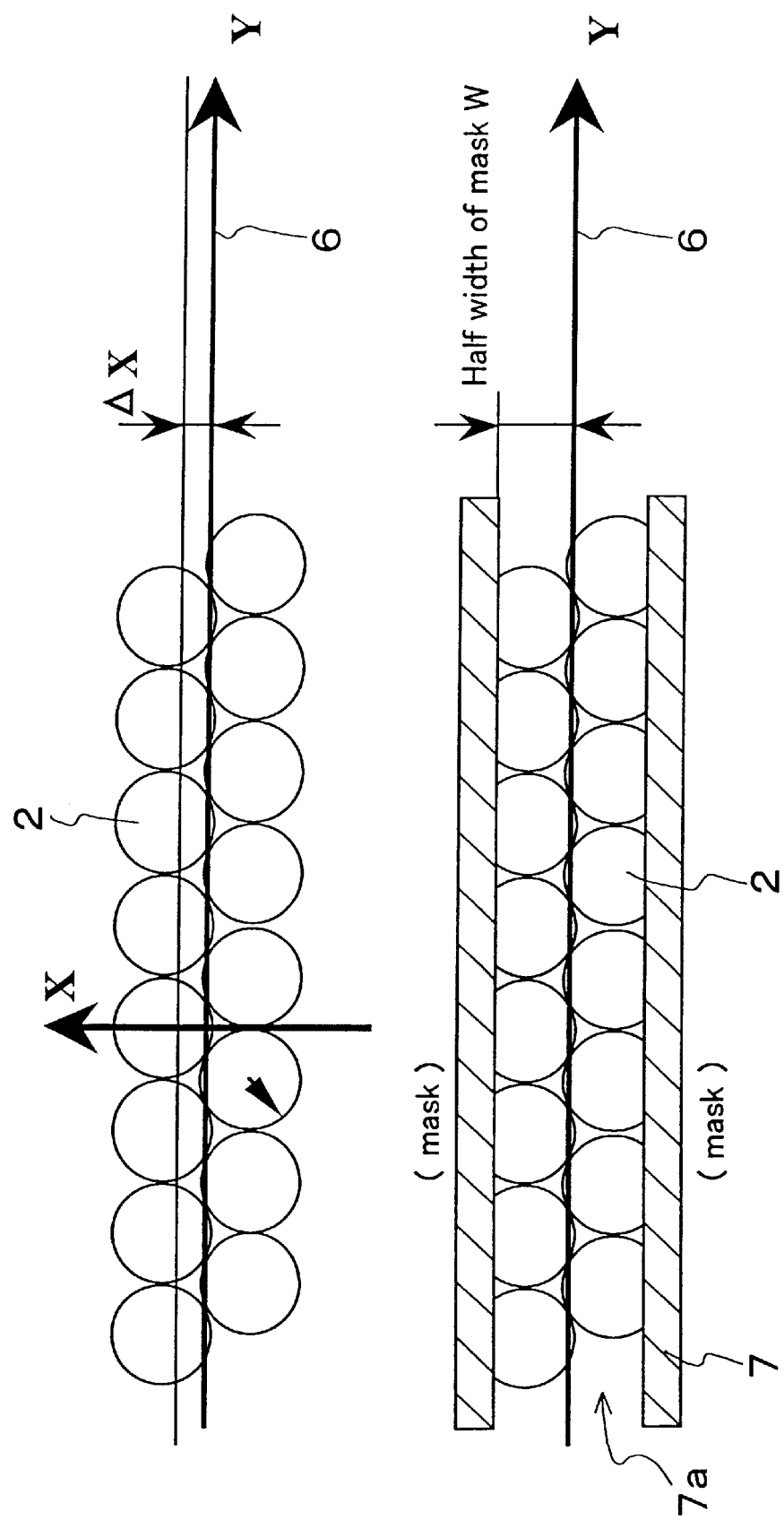
FIG. 10 is a plan view showing a rod lens array in a second embodiment according to the present invention.
Figure 11:
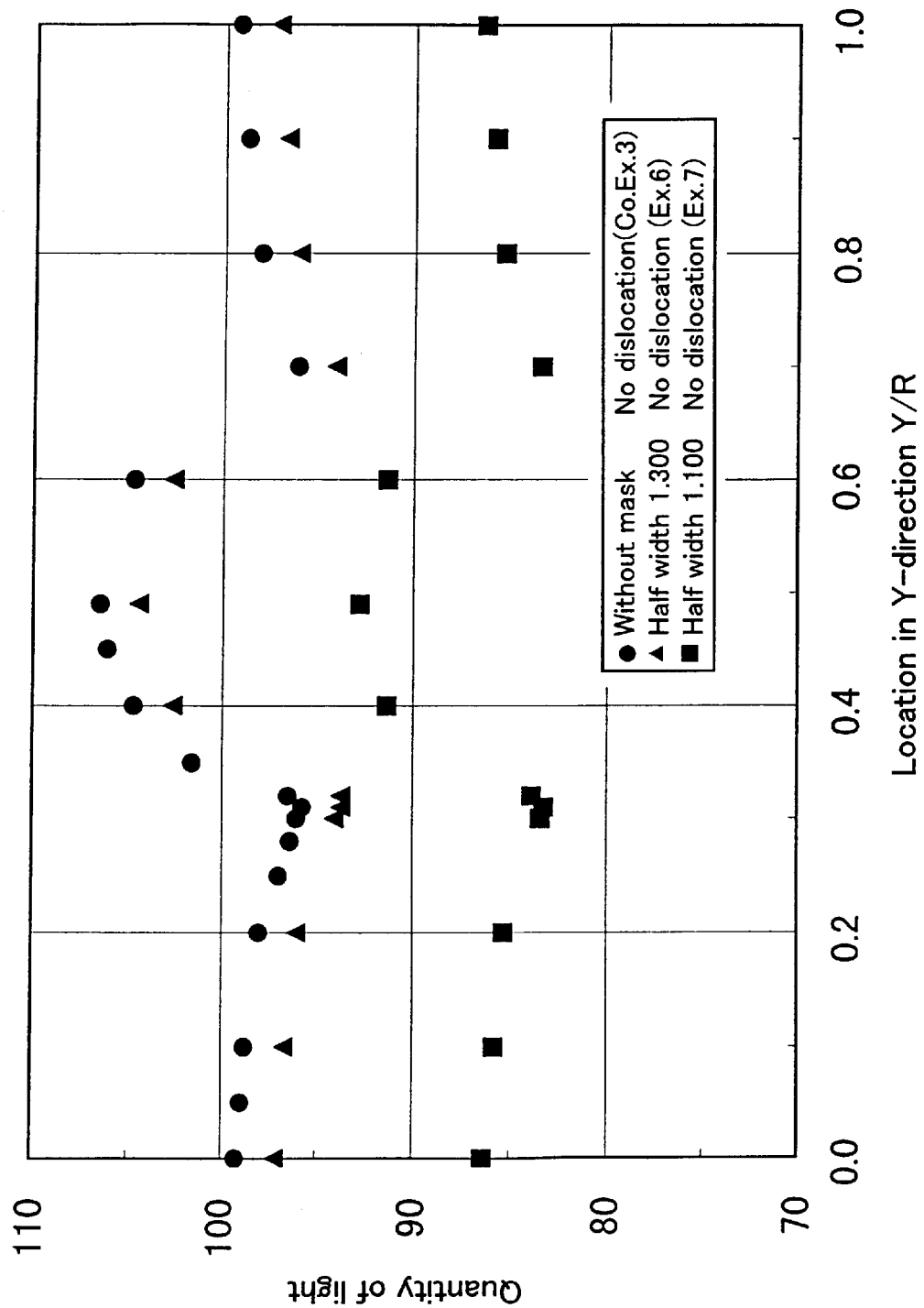
FIG. 11 is a graph showing an irregularity of the quantity of light in Examples 6 and 7 and Comparative Example 3 in the second embodiment according to the present invention (in the case where no dislocation occurs).
Figure 12:
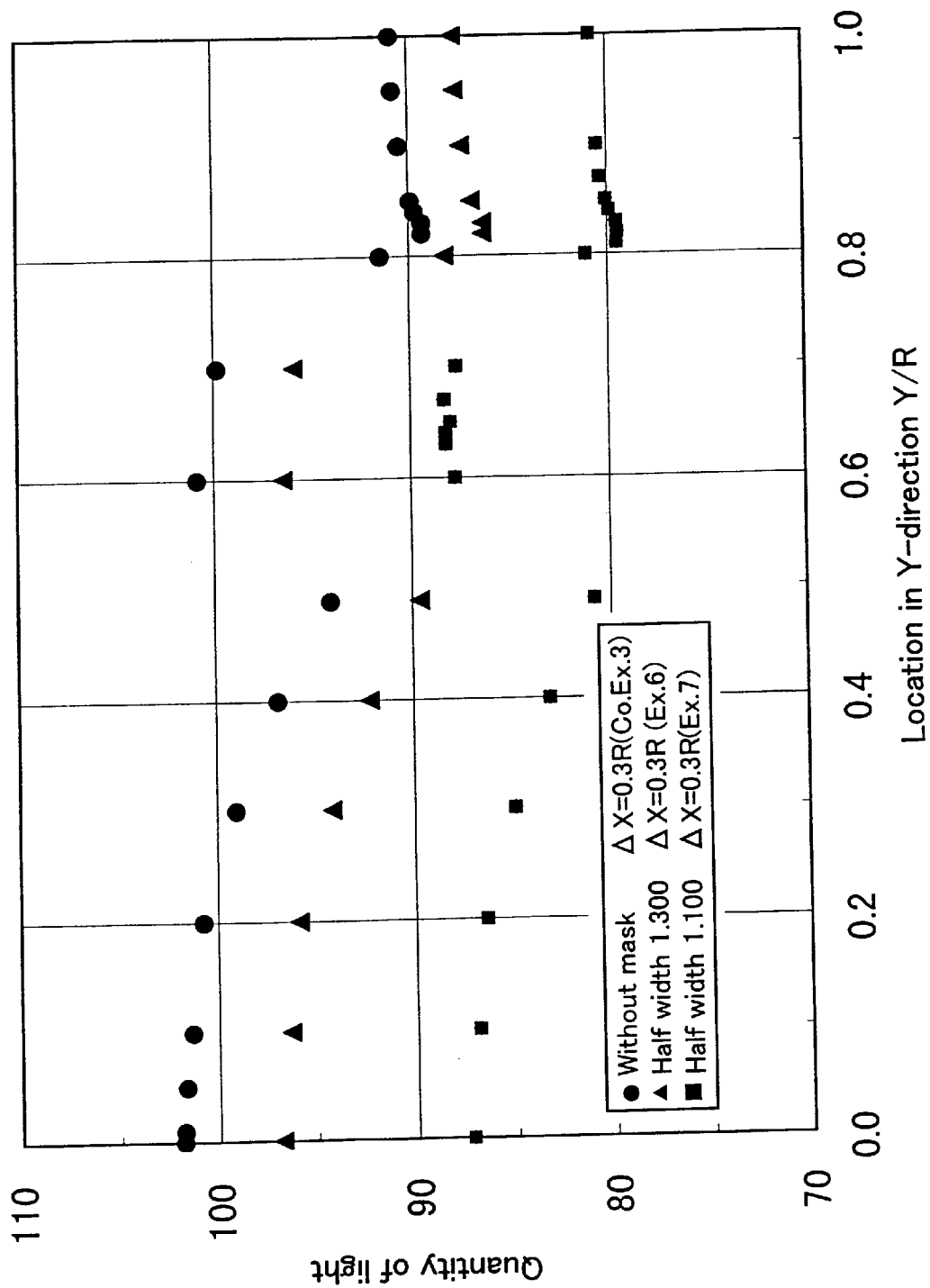
FIG. 12 is a graph showing an irregularity of the quantity of light in Examples 6 and 7 and Comparative Example 3 in the second embodiment according to the present invention (in the case where dislocation occurs).
Figure 13:
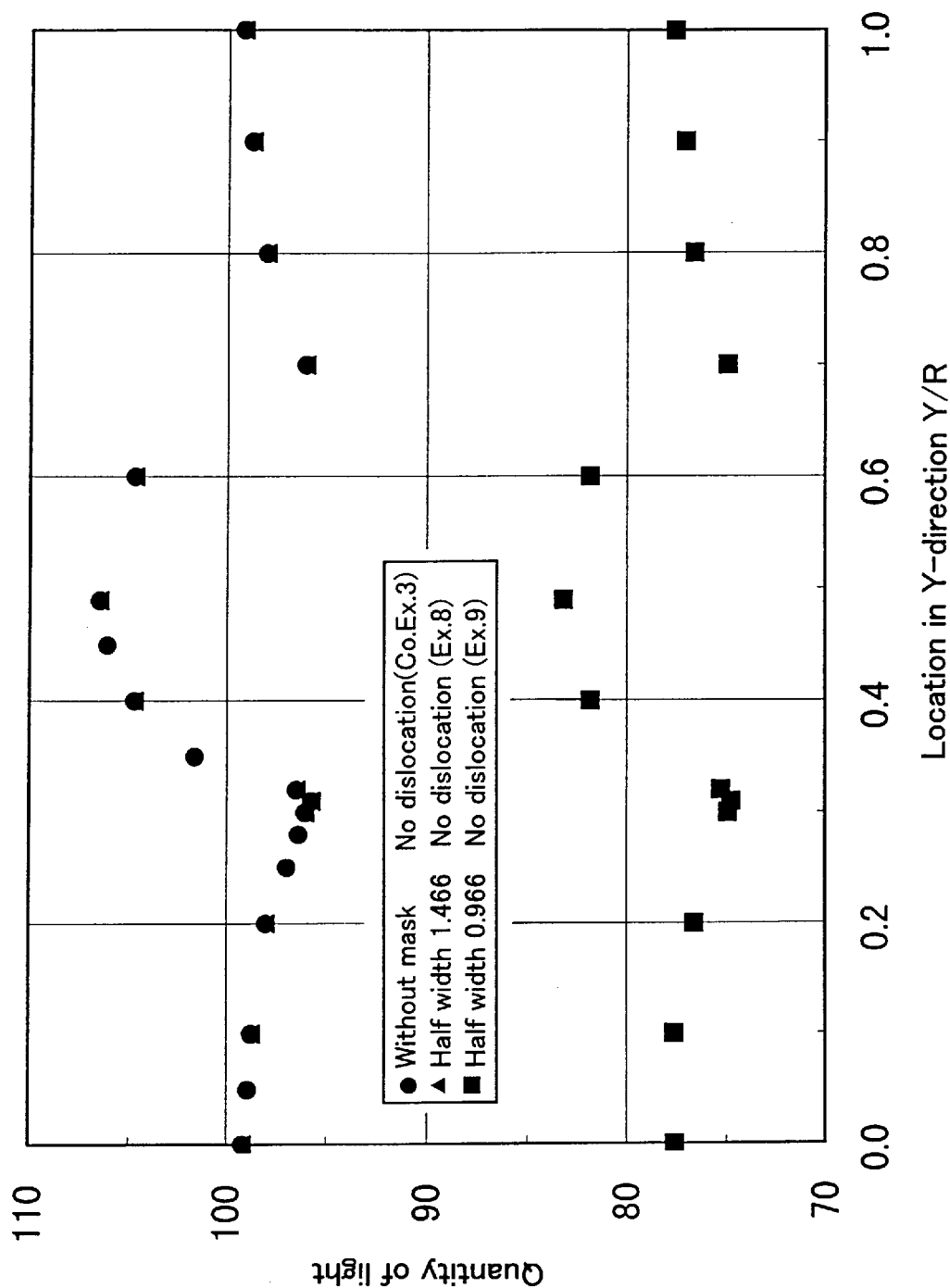
FIG. 13 is a graph showing an irregularity of the quantity of light in Examples 8 and 9 and Comparative Example 3 in the second embodiment according to the present invention (in the case where no dislocation occurs).
Figure 14:
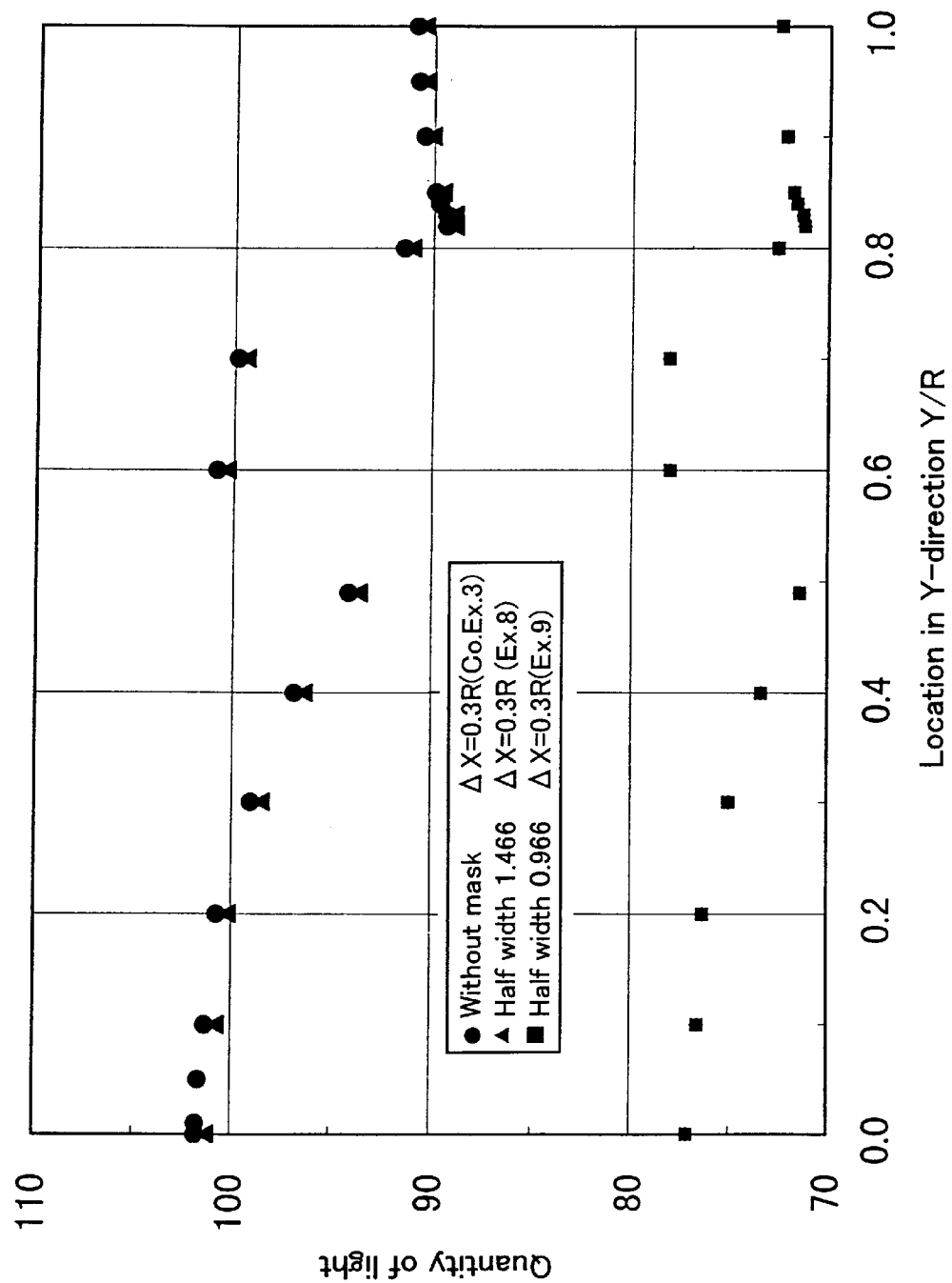
FIG. 14 is a graph showing an irregularity of the quantity of light in Examples 8 and 9 and Comparative Example 3 in the second embodiment according to the present invention (in the case where dislocation occurs).
Figure 15:
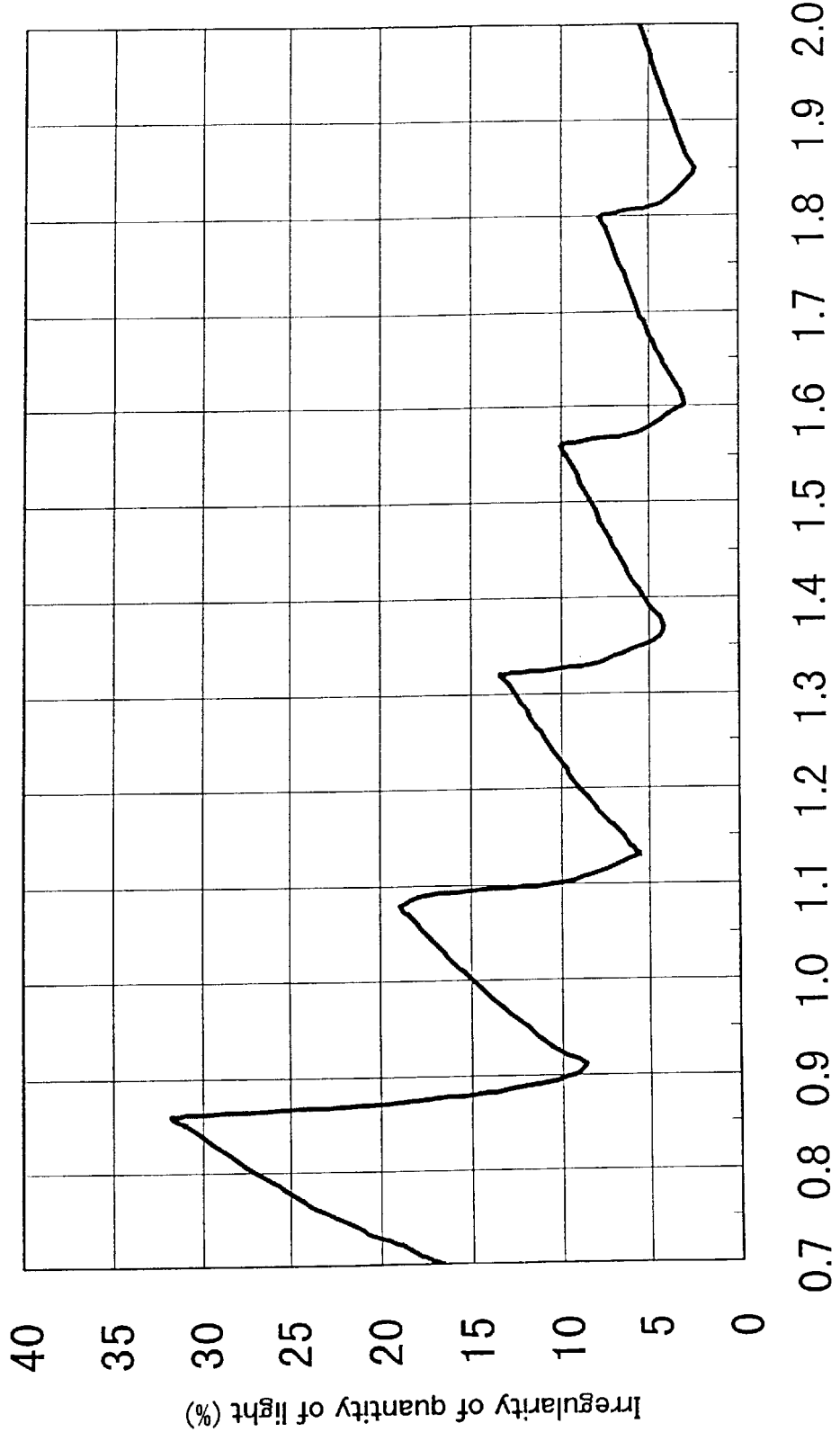
FIG. 15 is a graph showing a relationship between the overlapping degree m and the irregularity of the quantity of light amount in a rod lens array in which rod lenses are arranged in two rows.
Figure 16:
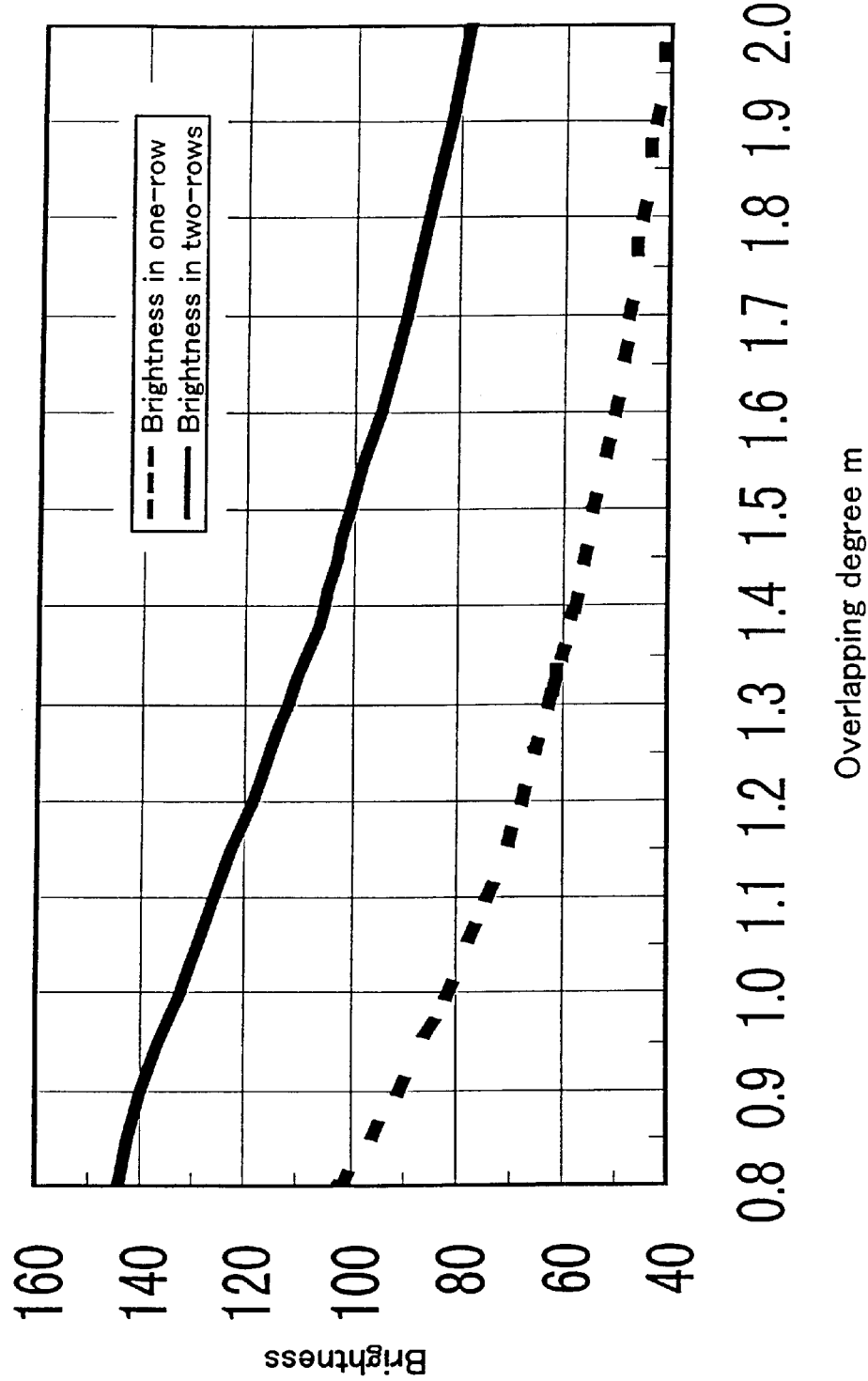
FIG. 16 is a graph showing a relationship between the overlapping degree m and the brightness in a rod lens array.

FIG. 10 is a plan view showing a rod lens array in a second embodiment according to the present invention. As shown in FIG. 10, a shading mask 7 having an approximately rectangular shaped opening portion 7a opening along the longitudinal direction of the rod lens array 2 is arranged on one side of the rod lens array 2. The shading mask 7 having such a configuration is preferable because it is simple and easy to be set.

An example of the method for setting the shading mask 7 includes the following methods: (1) a method of attaching a metal or plastic thin plate having a slit to the lens surface of the rod lens array 2; (2) a method of directly printing the shading portion of the lens surface of the rod lens array 2 with black ink, etc; and (3) a method of providing a frame in which the rod lens array 2 is incorporated as a component with a function of a shading mask, and the like.

It is desirable that the opening portion 7a of the shading mask 7 is symmetric to the central axis in the longitudinal direction of the lens surface of the rod lens array 2. Furthermore, it is desirable that the half width W of the opening portion 7a of the shading mask 7 is in the range of $(\sqrt{3}/2) R+0.1 r_0 \leq W \leq (\sqrt{3}/2) R+0.6 r_0$, wherein $r_0$ denotes a radius of the portion functioning as a lens of the rod lenses 1. When the half width W of the opening portion 7a of the shading mask 7 is less than $(\sqrt{3}/2) R+0.1 r_0$, the quantity of light is much lowered. When the half width W is more than $(\sqrt{3}/2)R+0.6 r_0$, improvement of the irregularity of the quantity of light is hardly realized.

The effect of the shading mask 7 particularly is increased when the irregularity of the quantity of light is relatively small even if the shading mask 7 is not provided, that is, the overlapping degree m is in the range of $0.91 \leq m \leq 1.01$ (see First Embodiment above).

Second Example

Hereinafter, the present invention is described in detail with reference to the specific Examples. The following Examples and Comparative Examples use a rod lens array 2 in which a plurality of columnar rod lenses 1 having a refractive index distribution in the radial direction are arranged in two rows for one-to-one imaging with their optical axes 1a in parallel to each other.

In Examples and Comparative Examples, the distance 2 R between the optical axes of neighboring rod lenses is 1.000 mm, and the overlapping degree m is 0.940. Specific set values are shown in Table 5.

TABLE 5

|  | Example 6,7,8,9, Co. Ex. 3 |
|---|---|
| Design wavelength | 570 nm |
| Center refractive index $n_0$ | 1.600 |
| Coefficient of refractive index distribution g | 0.2618 $mm^{-1}$ |
| Coefficient of refractive index distribution $h_4$ | +1 |
| Coefficient of refractive index distribution $h_6$ | −10 |
| Effective radius of lenses $r_0$ | 0.500 mm |
| $n_0 \cdot g \cdot r_0$ | 0.20944 |
| Length of lens $Z_0$ | 16.285 mm |
| $Z_0/P$ | 0.678 |
| Distance between lenses 2R | 1.000 mm |
| $r_0/R$ | 1.00 |
| Distance between lens and image L | 3.800 mm |
| Radius of field of view $X_0$ | 0.940 mm |
| Overlapping degree m | 0.940 |

In Example 6, the half width W of the opening portion 7a of the shading mask 7 is expressed by W=1.3 R=($\sqrt{3}/2$) R+0.434 $r_0$. In Example 7, W=1.1 R=($\sqrt{3}/2$) R+0.234 $r_0$; in Example 8, W=1.466 R=($\sqrt{3}/2$) R+0.600 $r_0$; in Example 9, W=0.966 R=($\sqrt{3}/2$) R+0.100 $r_0$. In Comparative Example 3, the shading mask 7 is not provided. The irregularity of the quantity of light in each case was calculated when the dislocation does not occur and when amount of the dislocation is ΔX=0.3 R. The calculated results are shown in Tables 6 and 7 and FIGS. 11, 12, 13 and 14.

TABLE 6

|  | Co. Ex. 3 (without mask) | | Example 6 | | Example 7 | |
|---|---|---|---|---|---|---|
| Amount of dislocation ΔX | 0 | 0.3R | 0 | 0.3R | 0 | 0.3R |
| Average quantity of light | 100.00 | 97.03 | 97.94 | 92.79 | 87.02 | 84.33 |
| Maximum quantity of light | 106.52 | 101.80 | 104.44 | 96.82 | 92.76 | 88.32 |
| Minimum quantity of light | 95.74 | 89.34 | 93.69 | 86.31 | 83.24 | 79.49 |
| Irregularity of quantity of light (%) | 11.26 | 13.95 | 11.47 | 12.18 | 11.44 | 11.11 |

TABLE 7

|  | Example 8 (without mask) | | Example 9 | |
|---|---|---|---|---|
| Amount of dislocation ΔX | 0 | 0.3R | 0 | 0.3R |
| Average quantity of light | 100.00 | 96.56 | 78.16 | 74.84 |
| Maximum quantity of light | 106.52 | 101.26 | 83.18 | 78.11 |
| Minimum quantity of light | 95.74 | 88.98 | 74.77 | 71.26 |
| Irregularity of quantity of light (%) | 11.26 | 13.80 | 11.24 | 9.61 |

The quantity of light is evaluated by the use of the optical design software "Oslo Six" by Sinclair Optics (US). The number of light beams reaching the image surface emitted from the light source is defined as "brightness." Furthermore, the average quantity of light (=100) in Comparative Example 3 without dislocation was defined as the standard of the quantity of light.

As shown in the above Tables 6, and 7 and in FIGS. 11, 12, 13, and 14, the irregularity of the quantity of light at amount of dislocation ΔX of 0.3 R reaches 13.95% in Comparative Example 3. However, in Examples 6 to 9, the irregularity of the quantity of light was improved by 12.18%, 11.11%, 13.80% and 9.61%, respectively. On the other hand, when no dislocation occurs, the irregularity of the quantity of light almost is not changed even if the shading mask 7 is provided.

The deterioration of the average quantity of light with respect to the case where the shading mask is not provided (Comparative Example 3) is, 2% in Example 6, 13% in Example 7, 0% in Example 8 and 22% in Example 9 (in any of these cases, no dislocation occurs). It is effective to the application of use where the irregularity of the quantity of light is smaller than the average quantity of light.

In the Second Embodiment of the present invention, the values of R and m are not limited to the values shown in the Examples. It is desirable that the values of R and m are within the same range as those of the First Embodiment.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An optical imaging system for focusing light from a manuscript plane onto an image plane, comprising:

a rod lens array having a plurality of rod lenses with a refractive index distribution in a radial direction that are arranged in two rows so that their optical axes are in parallel to each other;

wherein an overlapping degree m expressed by the following equation (Eq. 1) is in a range of $0.91 \leq m \leq 1.01$;

$$m = X_0/2R \quad \text{(Eq. 1)}$$

wherein 2 R denotes a distance between the optical axes of neighboring rod lenses and $X_0$ denotes an image radius that the rod lenses project onto the image plane.

2. The optical imaging system according to claim 1, wherein the overlapping degree m is in the range of $0.93 \leq m \leq 0.97$.

3. The optical imaging system according to claim 1, wherein R is in the range of 0.05 mm $\leq$ R $\leq$ 0.60 mm.

4. The optical imaging system according to claim 1, wherein a radius $r_0$ of a portion functioning as a lens of the rod lenses is in the range of $0.50\ R \leq r_0 \leq 1.0\ R$.

5. The optical imaging system according to claim 1, wherein a shading mask having an approximately rectangular shaped opening portion opening along the longitudinal direction of the rod lens array is arranged on at least one side of the rod lens array.

6. The optical imaging system according to claim 5, wherein the opening portion of the shading mask is symmetric to the central axis in the longitudinal direction of the lens surface of the rod lens array.

7. The optical imaging system according to claim 6, wherein a half width W of the opening portion of the shading mask is in the range of $(\sqrt{3}/2)\ R + 0.1\ r_0 \leq W \leq (\sqrt{3}/2)\ R + 0.6\ r_0$, wherein $r_0$ denotes a radius of a portion functioning as a lens of the rod lenses.

8. The optical imaging system according to claim 1, wherein the refractive index distribution of the rod lenses is expressed by the following equation (Eq. 2);

$$n(r)^2 = n_0^2 \cdot \{1 - (g \cdot r)^2 + h_4 \cdot (g \cdot r)^4 h_6 \cdot (g \cdot r)^6 + h_8 \cdot (g \cdot r)^8 + \ldots\} \quad \text{(Eq. 2)}$$

wherein r denotes a radial distance from an optical axis of the rod lenses, $n_0$ denotes a refractive index at the optical axis of the rod lenses, and g, $h_4$, $h_6$ and $h_8$ denote coefficients of the refractive index distribution.

9. The optical imaging system according to claim 8, wherein the refractive index $n_0$ at the optical axis of the rod lenses is in the range of $1.4 \leq n_0 \leq 1.8$.

10. The optical imaging system according to claim 8, wherein a product $n_0 \cdot g \cdot r_0$ is in the range of $0.05 \leq n_0 \cdot g \cdot r_0 \leq 0.50$, wherein $r_0$ denotes a radius of a portion functioning as a lens of the rod lenses.

11. The optical imaging system according to claim 8, wherein $Z_0/P$ is in the range of $0.5 < Z_0/P < 1.0$, wherein $Z_0$ denotes a length of the rod lens and $P = 2\pi/g$ denotes a one-pitch length of the rod lenses.

12. The optical imaging system according to claim 1, wherein a parallel plane transparent substrate is arranged so that the manuscript plane is positioned at a front focal position of the rod lens array.

13. The optical imaging system according to claim 12, wherein the parallel plane transparent substrate is in contact with the lens surface of the rod lens array.

* * * * *